United States Patent
Iwai

(10) Patent No.: US 9,025,197 B2
(45) Date of Patent: May 5, 2015

(54) OPTICAL SCANNING DEVICE IN IMAGE FORMING APPARATUS, AND CONTROL METHOD THEREOF

(75) Inventor: Hitoshi Iwai, Abiko (JP)

(73) Assignee: Canon Kabushiki Kaisha (JP)

( * ) Notice: Subject to any disclaimer, the term of this patent is extended or adjusted under 35 U.S.C. 154(b) by 1264 days.

(21) Appl. No.: 12/125,386

(22) Filed: May 22, 2008

(65) Prior Publication Data

US 2008/0291510 A1 Nov. 27, 2008

(30) Foreign Application Priority Data

May 22, 2007 (JP) ................................. 2007-135951

(51) Int. Cl.
| | | |
|---|---|---|
| G06F 15/00 | (2006.01) | |
| H04N 1/04 | (2006.01) | |
| B41J 2/47 | (2006.01) | |
| B41J 15/14 | (2006.01) | |
| H04N 1/047 | (2006.01) | |
| H04N 1/50 | (2006.01) | |

(52) U.S. Cl.
CPC ............. *H04N 1/0473* (2013.01); *H04N 1/506* (2013.01); *H04N 2201/0471* (2013.01); *H04N 2201/04722* (2013.01); *H04N 2201/04731* (2013.01); *H04N 2201/04787* (2013.01); *H04N 2201/04791* (2013.01); *H04N 2201/04793* (2013.01)

(58) Field of Classification Search
None
See application file for complete search history.

(56) References Cited

U.S. PATENT DOCUMENTS

| 2005/0024479 A1* | 2/2005 | Itabashi et al. ................. 347/243 |
| 2005/0098716 A1* | 5/2005 | Yoshikawa et al. ........... 250/235 |
| 2005/0151826 A1* | 7/2005 | Suzuki et al. .................. 347/225 |
| 2007/0057989 A1* | 3/2007 | Noguchi .......................... 347/19 |

FOREIGN PATENT DOCUMENTS

| JP | 9090695 A | 4/1997 |
| JP | 2003276235 A | 9/2003 |
| JP | 3600228 B2 | 9/2004 |
| JP | 2007156259 A | 6/2007 |

* cited by examiner

*Primary Examiner* — Marcus T Riley
*Assistant Examiner* — Pawandeep Dhingra
(74) *Attorney, Agent, or Firm* — Rossi, Kimms & McDowell LLP

(57) ABSTRACT

An optical scanning device which forms a plurality of scanning lines in parallel in a main scanning direction on a photosensitive member by a plurality of laser beams detects the curvature values in the sub-scanning direction of the scanning lines, and corrects a curvature value in the sub-scanning direction corresponding to each of the scanning lines. When detecting the curvature value, the optical scanning device detects the curvature values in the sub-scanning direction of two scanning lines, and calculates the curvature value in the sub-scanning direction of a scanning line between the two scanning lines based on the detected curvature values in the sub-scanning direction of the two scanning lines. With this arrangement, the curvatures in the sub-scanning direction of scanning lines are corrected effectively with high accuracy for all laser beams in a multi-beam optical scanning device using a VCSEL or the like.

6 Claims, 13 Drawing Sheets

FIG. 4C 45f, 46b

| AREA | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| R1 | L2 | L4 | L6 | L8 | L9 | L10 | L11 | L11 | L11 | L11 | L10 | L9 | L8 | L6 | L4 | L2 |
| | -------- | | | | | | | | | | | | | | | |
| R2 | L22 | L23 | L24 | L25 | L26 | L26 | L27 | L27 | L27 | L27 | L26 | L26 | L25 | L24 | L23 | L22 |

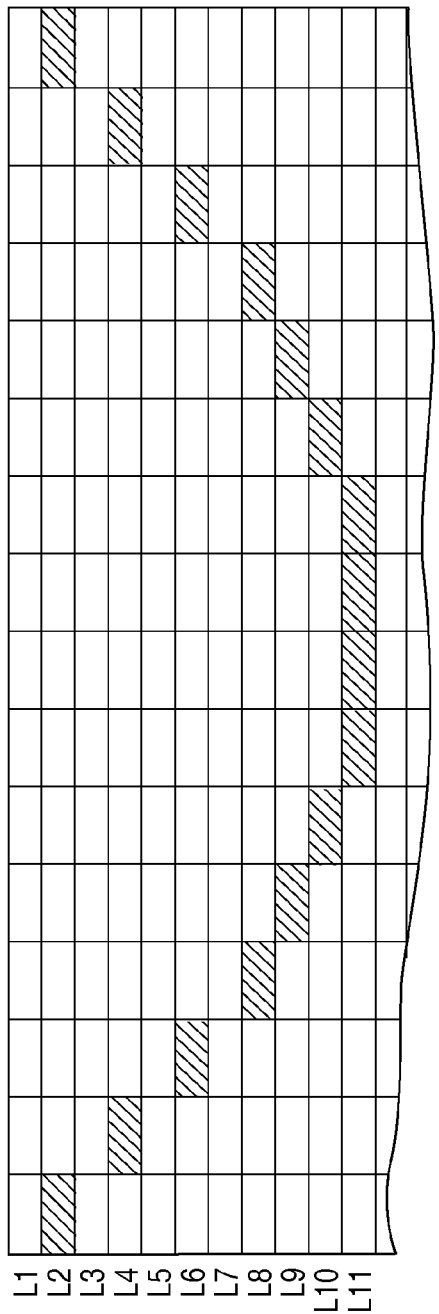

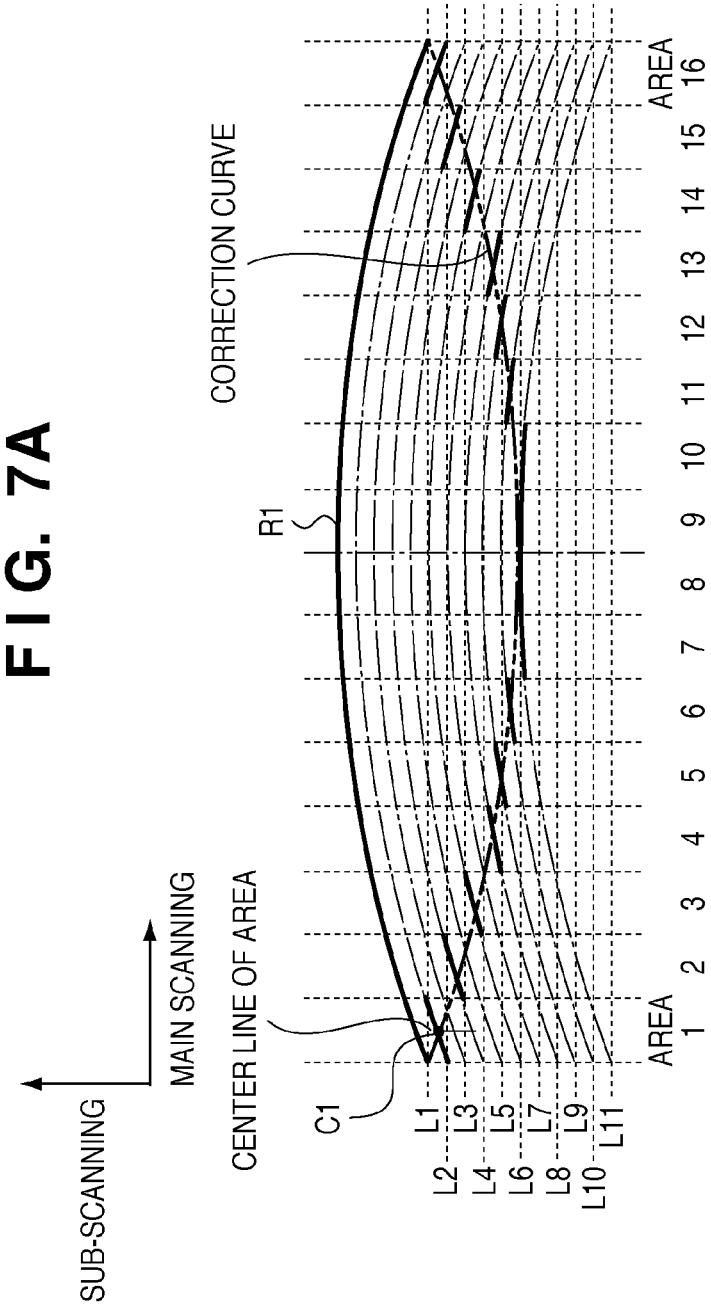

OPTICAL SCANNING DEVICE IN IMAGE FORMING APPARATUS, AND CONTROL METHOD THEREOF

BACKGROUND OF THE INVENTION

1. Field of the Invention

The present invention relates to an optical scanning device in an image forming apparatus, and a control method thereof and, more particularly, to an optical scanning device in an image forming apparatus such as a copying machine or printer, a control method thereof, and the image forming apparatus.

2. Description of the Related Art

Recently, copying machines and printers which form an image using laser scanning are requested to have higher speeds and higher resolutions. To meet this request, there are proposed a technique of rotating at a higher speed a polygon mirror which scans a laser, and a technique of increasing the number of emitting portions from which laser beams are emitted.

However, speeding up of the polygon mirror has limits considering heat and noise generated by windage, the strength of the mirror itself, the rotation capability of the motor, and the like.

From this, the mainstream for increasing the speed and resolution is shifting to the use of light of multi-beams emitted from a high-density light source such as a vertical-cavity surface-emitting laser (VCSEL). This is a technique of increasing the number of laser beam-emitting portions much more than the conventional one by using a high-density light source, and scanning with many laser beams in parallel.

To increase the speed, an image forming apparatus of a so-called tandem system is advantageous among recently popular color image forming apparatuses. In the tandem system, images of four colors, that is, yellow, magenta, cyan, and black are formed on independent photosensitive members, and finally overlaid on a transfer member. The image forming apparatus of the tandem system obtains a color image by overlaying images formed by separate scanning mechanisms. If the inclination or curvature of each scanning line occurs in the sub-scanning direction on the photosensitive member, this appears as color misregistration or color inconsistency and becomes a factor of making the image quality lost.

There has been conventionally known a method for correcting the curvature in the sub-scanning direction of a scanning line. For example, there is a method of canceling the curvature by mechanically bending the reversion mirror of an optical scanning device. Japanese Patent No. 3600228 discloses another method of correcting the curvature in the sub-scanning direction of a scanning line. According to this method, an image formable effective scanning area is divided into a plurality of regions in the main scanning direction. The write position in each divided region is offset in the sub-scanning direction, correcting the curvature in the sub-scanning direction of a scanning line.

However, the following problems arise in the conventional methods of correcting the curvature in the sub-scanning direction of a scanning line.

It is technically possible to increase the number of emitting portions to several ten in an optical scanning device using a VCSEL or the like in order to meet the recent demand for high speeds and high resolutions. If the number of laser beams reaches several ten, the laser beams distribute widely in the sub-scanning direction. Assuming that the number of scanning lines is 48 in a 2,400 dpi-resolution optical scanning device, the distance between scanning lines at both ends in the sub-scanning direction increases to about 0.4 mm.

A main factor of the curvature in the sub-scanning direction of a scanning line is aberration of an imaging lens. The aberration changes depending on the sub-scanning position of a laser beam passing through the imaging lens, so the value of generated curvature changes depending on the laser beam. In some cases, the difference in curvature value between laser beams spaced apart from as much as 0.4 mm increases to 5 to 10 µm. In an image forming apparatus, even 5-µm color misregistration lowers the image quality, so the difference in curvature value should be eliminated.

To the contrary, according to the conventional mechanical mirror bending and the method of correcting the curvature in the sub-scanning direction of a scanning line as disclosed in Japanese Patent No. 3600228, all laser beams are uniformly corrected, and the difference of curvature value in the sub-scanning direction between scanning lines cannot be eliminated.

SUMMARY OF THE INVENTION

The present invention has been made to overcome the conventional drawbacks, and has as its object to correct the curvatures in the sub-scanning direction of scanning lines effectively with high accuracy for all laser beams in a multi-beam optical scanning device using a VCSEL or the like.

It is another object of the present invention to provide an image forming apparatus having the optical scanning device and a control method thereof.

To solve the conventional problems, the present invention provides an optical scanning device according to the present invention which forms a plurality of scanning lines in parallel in a main scanning direction on a photosensitive member by a plurality of laser beams, comprising: a curvature value detection unit adapted to detect curvature values in a sub-scanning direction of the plurality of scanning lines; and a curvature correction unit adapted to correct a curvature value in the sub-scanning direction corresponding to each of the plurality of scanning lines based on the curvature values detected by the curvature detection unit.

Also, the present invention provides an image forming apparatus including an optical scanning device as mentioned above.

Further, the present invention provides a method of controlling an image forming apparatus including an optical scanning device which forms a plurality of scanning lines in parallel in a main scanning direction on a photosensitive member by a plurality of laser beams, the method comprising the steps of: detecting curvature values in a sub-scanning direction of the plurality of scanning lines; and correcting a curvature value in the sub-scanning direction corresponding to each of the plurality of scanning lines based on the curvature values detected in the detecting step.

The above-described arrangement can attain the following effects.

1. Even when the curvature values in the sub-scanning direction of scanning lines differ from each other in a multi-beam optical scanning device, appropriate curvature correction can be done in accordance with the curvature value of each scanning line. As a result, a high-quality image free from color misregistration or change of tint can be obtained.

2. The curvature value of a scanning line is calculated using curvature data of some other scanning lines in a multi-beam optical scanning device. Thus, the amount of data stored in the apparatus can be reduced, the memory capacity can be saved, and the cost can be reduced.

3. When correcting the curvature by properly measuring the curvature value in the sub-scanning direction of a scanning line in an image forming apparatus, only some scanning lines can be measured to correct even other scanning lines. The time taken for correction can be shortened, and the downtime of the apparatus can also be shortened.

4. Even if the curvature value in the sub-scanning direction greatly varies between scanning lines in a multi-beam optical scanning device using an imaging lens having a large aberration, the variations can be reduced by correction. Accordingly, the degree of freedom of the optical design increases, and the lens can be manufactured at low cost.

Further features of the present invention will become apparent from the following description of exemplary embodiments with reference to the attached drawings.

BRIEF DESCRIPTION OF THE DRAWINGS

FIG. 4C is a table showing an example of the structure of curvature correction data (as a main scanning line selection table) according to the embodiment;

FIG. 4D is a view schematically showing an example of curvature correction based on curvature correction data according to the embodiment;

FIG. 7A is a view for explaining an example of curvature detection and correction processing according to the embodiment;

DESCRIPTION OF THE EMBODIMENTS

An embodiment of the present invention will be described below with reference to the accompanying drawings.

<Example of Arrangement of Optical Scanning Device in Image Forming Apparatus According to Embodiment>

Figure 1:
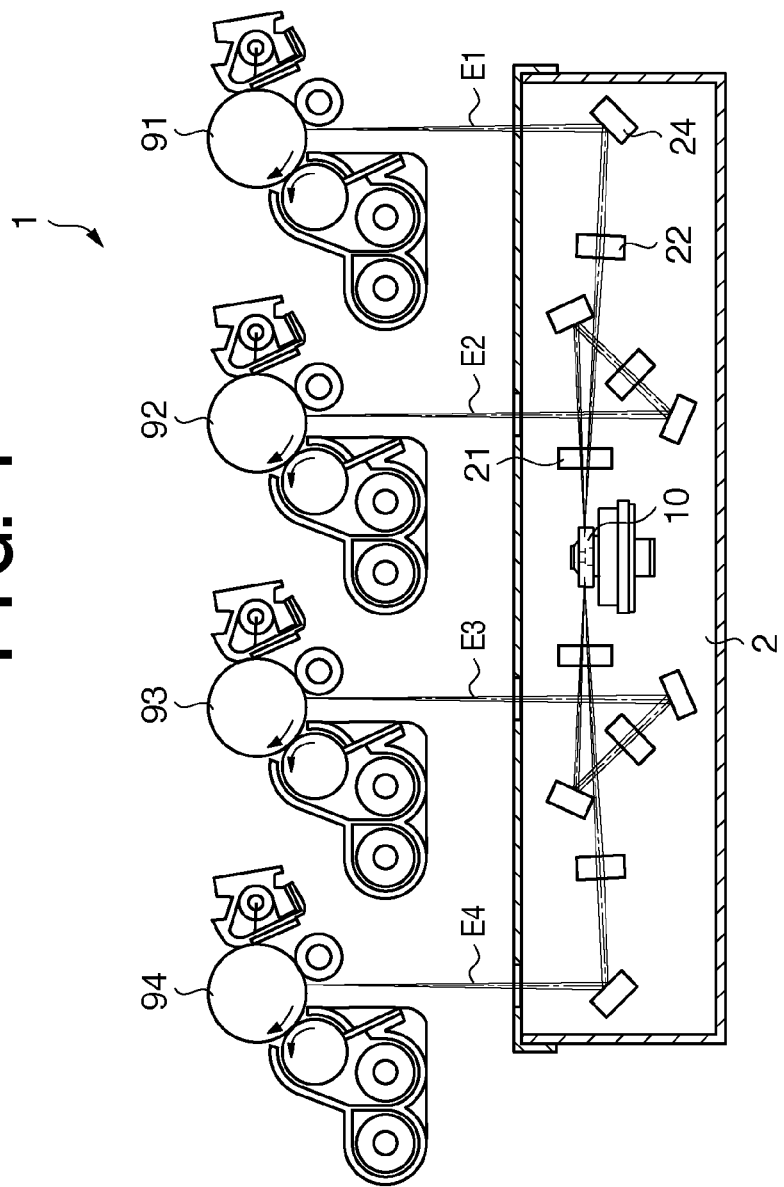
FIG. 1 is a sectional view showing an example of the arrangement of an optical scanning device which forms the image forming unit of an image forming apparatus according to an embodiment.
Figure 2:
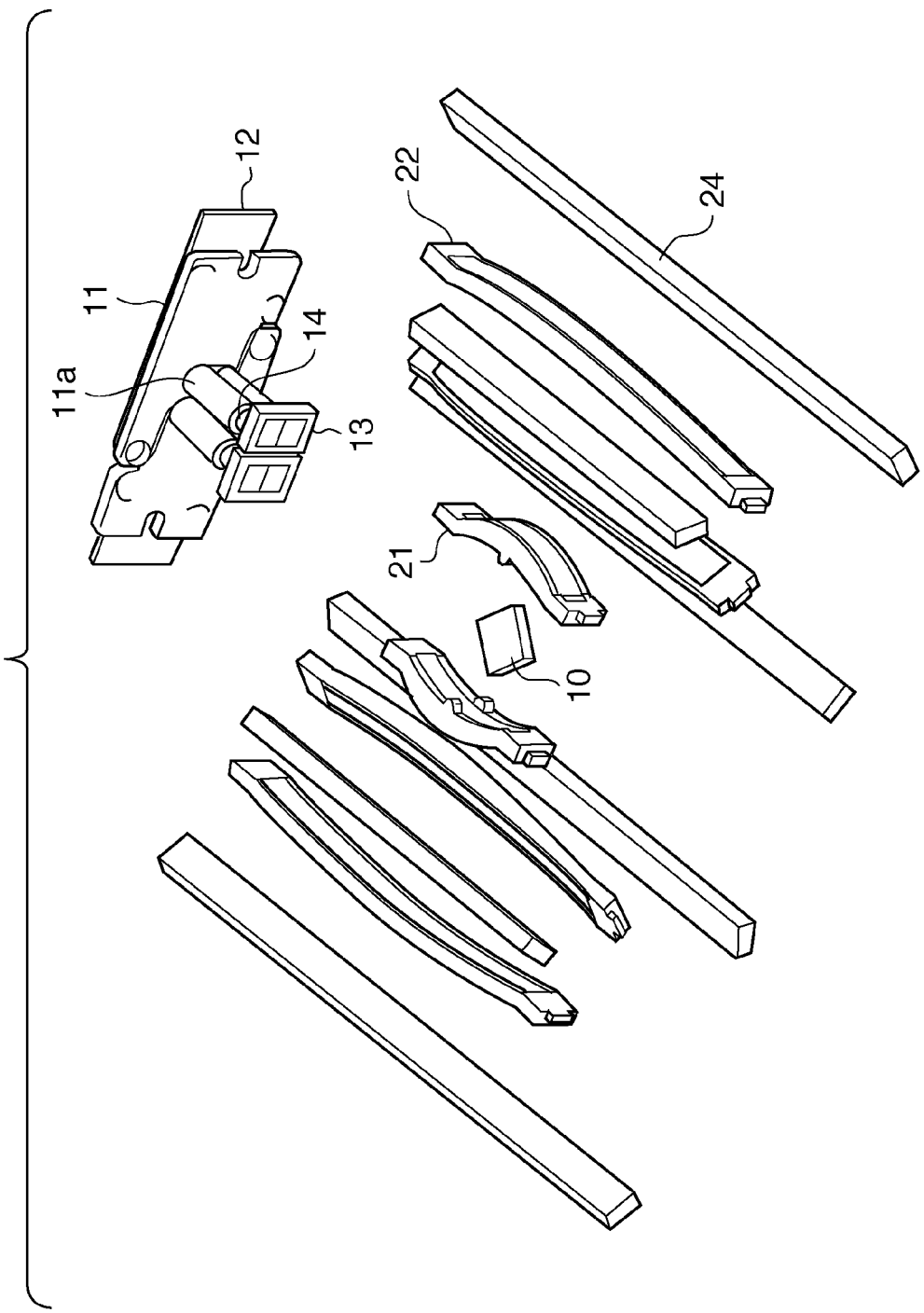
FIG. 2 is a perspective view showing main optical parts which form the optical scanning device according to the embodiment.

FIG. 1 is a sectional view of an optical scanning device which forms the image forming unit of an image forming apparatus according to the embodiment. FIG. 2 is a perspective view of an optical scanning system showing only main optical parts which form the optical scanning device.

The image forming apparatus in the embodiment is a color image forming apparatus of a so-called tandem system. An image forming unit 1 in FIG. 1 comprises photosensitive members 91 to 94 corresponding to four colors, that is, yellow, magenta, cyan, and black, and an optical scanning device 2 for forming latent images on the photosensitive members.

In the optical scanning device 2, optical parts are arranged almost symmetrically on the two sides of a polygon mirror 10. The optical scanning device 2 emits scanning laser beams E1 to E4 which reach the photosensitive members 91 to 94, respectively. The path of the scanning laser beam E1 will be exemplified.

An example of the arrangement of an optical incident system at the upstream side of the polygon mirror 10 will be explained with reference to FIG. 2. In FIG. 2, a laser holder 11 holds a semiconductor laser (for example, VCSEL: not shown) in each lens barrel holder 11a by press fitting. A laser driver substrate 12 drives the semiconductor laser. A stop (not shown) is arranged on the distal end side of the lens barrel holder 11a, and forms a laser beam emitted from the semiconductor laser into a desired optimal beam shape. A collimator lens 14 is attached to the distal end of the lens barrel holder 11a to collimate laser beams having passed through the stop into almost parallel ones. A cylindrical lens 13 has a predetermined refracting power in only the sub-scanning direction. The cylindrical lens 13 focuses parallel laser beams having passed through the collimator lens 14 into a linear image in the main scanning direction on the polygon mirror.

An optical scanning path at the downstream side of the polygon mirror 10 will be explained with reference to FIGS. 1 and 2. A laser beam entering the polygon mirror 10 from the above-mentioned optical incident system is deflected and scanned by the polygon mirror 10, and passes through first and second imaging lenses 21 and 22. The first and second imaging lenses 21 and 22 have a function of focusing a laser beam deflected and scanned by the polygon mirror 10 into a spot shape on the photosensitive member, and scanning the photosensitive member with the spot image at a constant speed. The first and second imaging lenses 21 and 22 are called as fθ lenses. Of the fθ lenses, the first imaging lens is a cylindrical lens which does not have refracting power in the sub-scanning direction. Thus, a laser beam is focused into an image in the sub-scanning direction by the second imaging lens 22. A mirror 24 is a final reversion mirror arranged for the laser beam of a semiconductor laser. The scanning laser beam E1 is reversed by the mirror 24 and focused into an image on the yellow photosensitive member 91.

As described above, the second imaging lens 22 has a function of focusing a laser beam scanned by the polygon mirror 10 into an image on the photosensitive member in the sub-scanning direction. At this time, the curvature in the sub-scanning direction of a scanning line occurs on the photosensitive member owing to lens aberration. The aberration is larger at the end of the lens than at the center. Therefore, the curvature in the sub-scanning direction of a scanning line becomes larger for a laser beam passing through the end of the lens.

Figure 3:
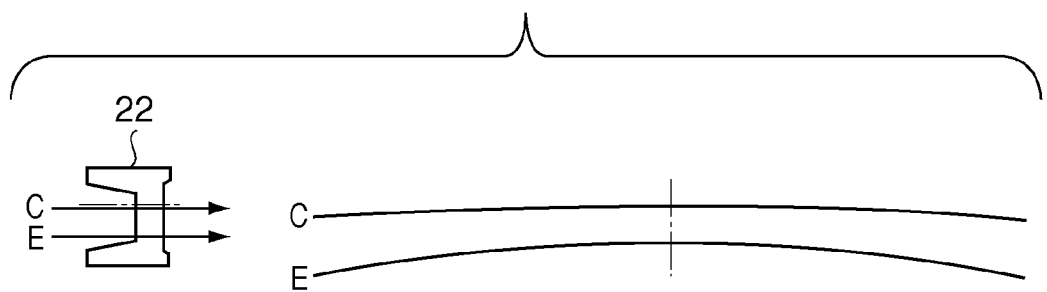
FIG. 3 is a conceptual view showing the conventional problem of the curvature of a main scanning line caused by an imaging lens.

FIG. 3 is a view for explaining the difference between the curvature values in the sub-scanning direction of scanning lines owing to the second imaging lens 22. As shown in FIG. 3, the curvature value in the sub-scanning direction of a scanning line on the photosensitive member differs between laser beam C passing through the vicinity of the center of the curved surface of the second imaging lens 22, and laser beam E passing through a position farthest from the center. Particularly for a VCSEL used as a light source in the embodiment, the number of scanning lines scanned in parallel sometimes reaches several ten. For this reason, the physical distance between a laser beam passing through the vicinity of the center of the lens and a laser beam passing through the end of the lens becomes much larger than the conventional one. Therefore, the difference in curvature value becomes non-negligible.

<Example of Arrangement of Image Forming Apparatus According to Embodiment>

Figure 10:
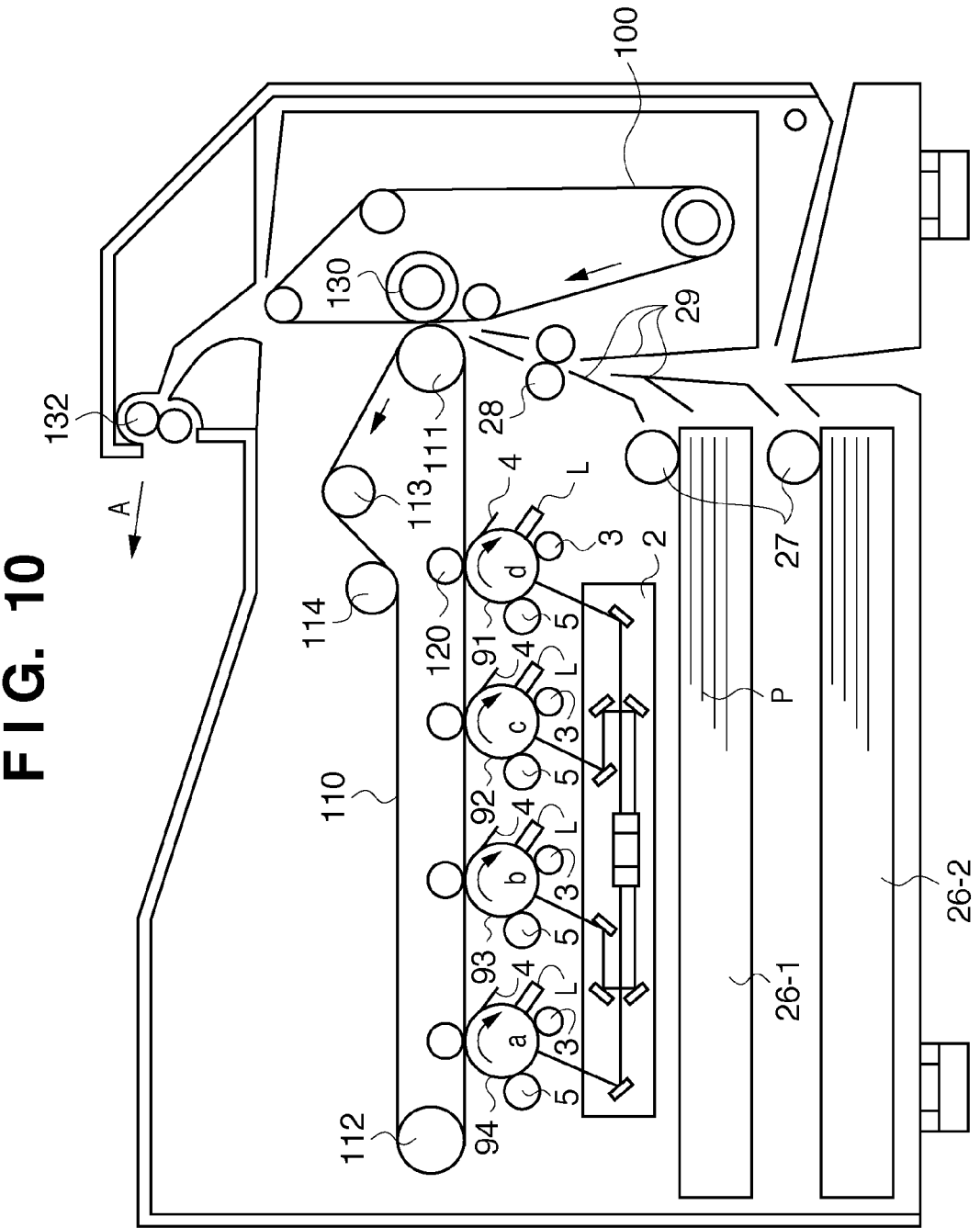
FIG. 10 is a schematic sectional view showing an example of the arrangement of the image forming apparatus according to the embodiment.

FIG. 10 is a schematic sectional view showing an example of the overall arrangement of an electrophotographic color copying machine serving as an example of the image forming apparatus having the image forming unit in FIG. 1.

Print media P are stored in sheet feeding units 26-1 and 26-2, and fed one by one by feeding rollers 27 to a registration roller pair 28 via guides 29. A discharging unit L, cleaning unit 4, charging unit 3, and developing unit 5 are arranged around each of the photosensitive members 91 to 94 which are rotatably supported and rotate in directions indicated by arrows. A space is secured between the charging unit 3 and the developing unit 5, and optical information emitted from the optical scanning device 2 enters the space. The embodiment adopts four photosensitive members 91 to 94 which are surrounded with identical image forming parts except that color materials (toners) used by the developing units 5 are different between the photosensitive members 91 to 94. The photosensitive members 91 to 94 can be ones prepared by, for example, forming a layer of an organic semiconductor serving as a photoconductive material on the surface of an aluminum cylinder about 30 to 100 mm in diameter. A photosensitive member having an amorphous silicon surface layer is also available.

The photosensitive members 91 to 94 may also be belt-like ones. The optical scanning device 2 may be a known laser type optical scanning device having an imaging unit and an LED array for irradiating the surface of each of the uniformly charged photosensitive members 91 to 94 with light serving as a latent image.

The photosensitive members 91 to 94 are partially in contact with an intermediate transfer member 110. The intermediate transfer member 110 is a belt-like intermediate transfer member which is supported and looped between rollers 111, 112, 113, and 114 and is movable in a direction indicated by the arrow. The intermediate transfer member 110 is a belt made of a 20 to 600-μm thick resin film or rubber serving as a base. The intermediate transfer member 110 has a resistance value capable of electrostatically transferring toner from the photosensitive members 91 to 94. Primary transfer portions 120 are arranged inside the belt loop of the intermediate transfer member 110 near the photosensitive members 91 to 94. The primary transfer portions 120 may also be a roller for applying high voltage, but may also use charges from an electrode. Toner images of the respective colors formed on the photosensitive members 91 to 94 are sequentially electrostatically transferred and overlaid onto the intermediate transfer member 110 by the primary transfer portions 120, forming a color toner image.

A conveyance belt 100 is arranged on the right side in FIG. 10. The conveyance belt 100 conveys a print medium P to a nip formed between the roller 111 and a secondary transfer portion 130. The color toner image formed by overlaying toner images of the respective colors on the intermediate transfer member 110 is transferred onto the print medium P. The print medium P bearing the color toner image is discharged after fixing by a fixing unit 132.

<Example of Arrangement of Curvature Correction Unit in Image Forming Apparatus According to Embodiment>

Figure 4A:
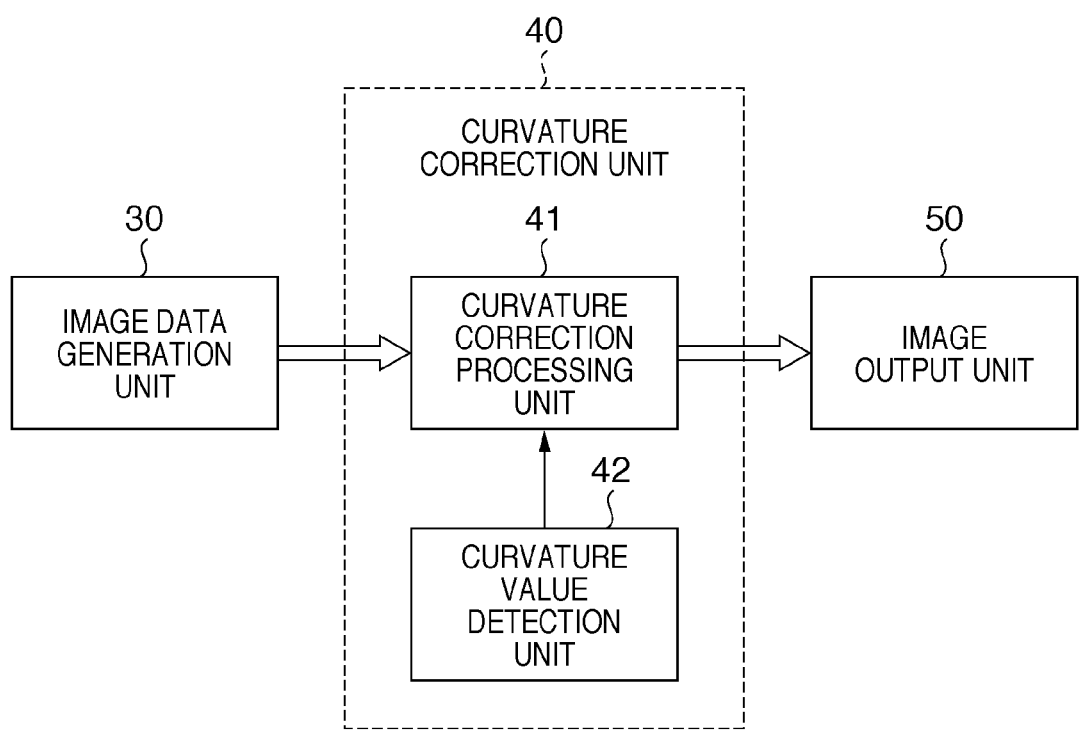
FIG. 4A is a block diagram showing an example of the functional configuration of a curvature correction unit according to the embodiment.

FIG. 4A is a block diagram showing an example of data processing in the image forming apparatus having a scanning line curvature correction unit according to the embodiment.

As shown in FIG. 4A, the image forming apparatus in the embodiment mainly comprises an image data generation unit 30, curvature correction unit 40, and image output unit 50. The curvature correction unit 40 includes a curvature value detection unit 42 and curvature correction processing unit 41.

The curvature value detection unit 42 detects the curvature value in the sub-scanning direction of a scanning line by reading a test pattern (to be described later with FIGS. 5 and 6) on the intermediate transfer member 110, and outputs the information to the curvature correction processing unit 41.

When forming an image, the curvature correction processing unit 41 generates correction data corresponding to image data input from the image data generation unit 30 based on correction information input from the curvature value detection unit 42. The image output unit 50 outputs an image using the correction data.

Figure 4B:
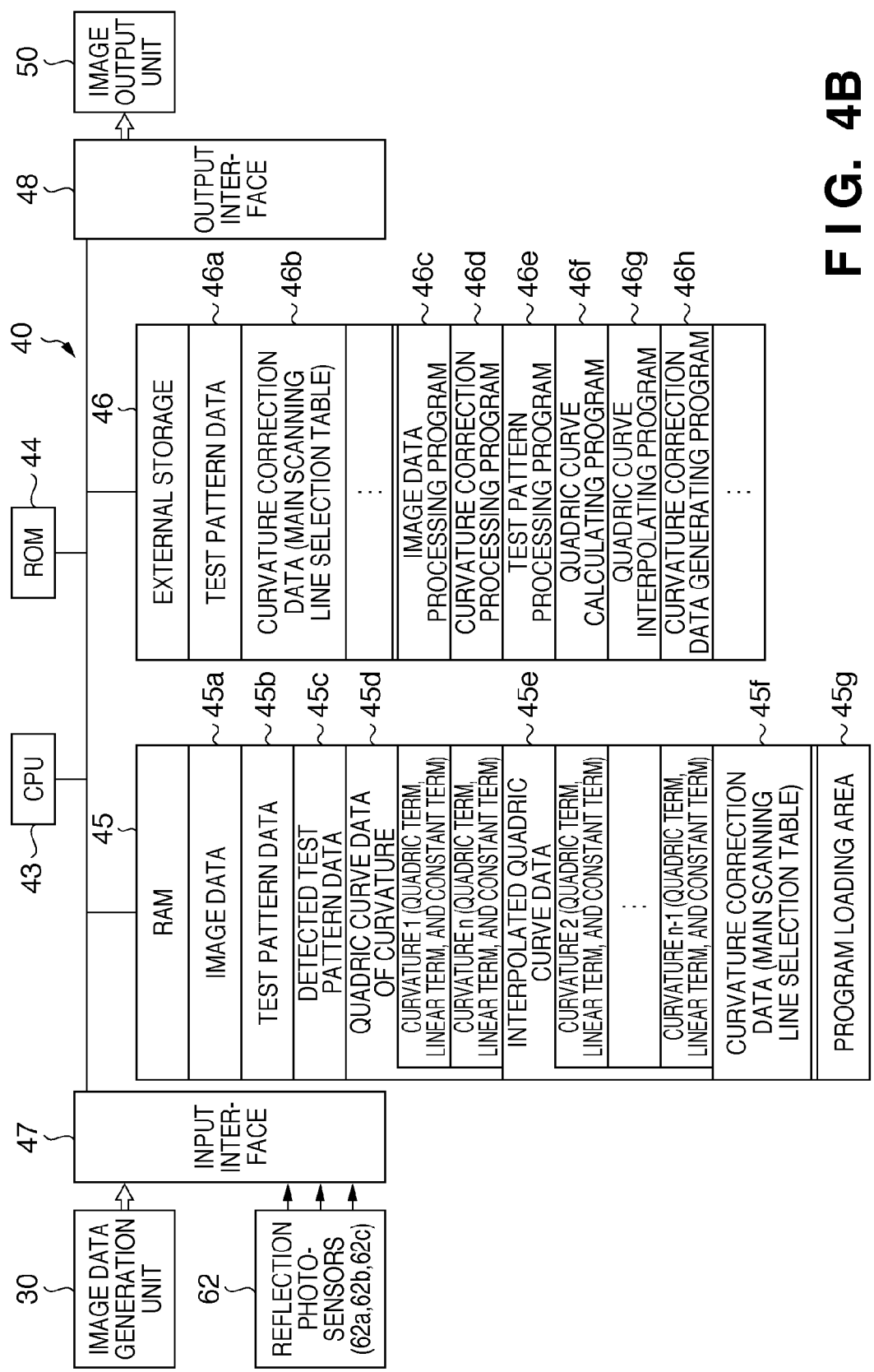
FIG. 4B is a block diagram showing an example of the hardware configuration of the curvature correction unit according to the embodiment.

FIG. 4B is a block diagram showing an example of the hardware configuration of the curvature correction unit in FIG. 4A.

In FIG. 4B, a CPU 43 is an arithmetic control unit for controlling the curvature correction unit 40. In FIG. 4B, the CPU 43 is illustrated as if it were dedicated to the curvature correction unit 40, but may also be used for another image formation control, for example, control of the image data generation unit 30 and image output unit 50. A ROM 44 stores permanent programs and parameters. In this example, a configuration will be described in which system programs and application programs are stored in an external storage 46, loaded to a RAM 45, and executed by the CPU 43. However, when the CPU 43 dedicatedly controls the curvature correction unit 40, programs are hardly changed and thus may also be stored in the ROM 44.

The RAM 45 temporarily stores data while the CPU 43 performs control in accordance with a program. The RAM 45 has a data storage area and program loading area. In the data storage area, the following storage areas are allocated as areas particularly related to the embodiment. FIG. 4B shows only data unique to the embodiment.

An area 45*a* stores image data for forming an image. An area 45*b* stores test pattern data for forming a test pattern on the intermediate transfer member 110 in order to detect the curvature value in the sub-scanning direction of a scanning line. An area 45*c* stores detected test pattern data serving as information obtained by detecting a test pattern on the intermediate transfer member 110 by photo-sensors.

An area 45*d* stores the two quadric curves of the curvature value that are calculated from detected test pattern data. In this example, the two quadric curves of curvatures are calculated for main scanning lines scanned by two laser beams passing through the center of the imaging lens 22 and a position farthest from the center, respectively. The two quadric curves are stored respectively as a set of a quadric term, linear term, and constant term. An area 45e stores the interpolated quadric curves of the curvatures of laser beams between two laser beams that are interpolated based on the two quadric curves of the curvatures of main scanning lines scanned by the two laser beams (to be described later with FIG. 9).

An area 45f stores curvature correction data for correcting curvature in correspondence with each quadric curve of curvature. In this example, the each curvature is corrected based on a table for selecting main scanning lines so as to shift the main scanning lines, as shown in FIGS. 4C, 7A, 7B, 8A, and 8C (to be described later).

In a program loading area 45g, a program to be executed by the CPU 43 is loaded from an external storage 46.

The large-capacity external storage 46 is, for example, a disk, CD, or memory card for storing programs and data. The external storage 46 has a data storage area and program storage area. FIG. 4B shows only data and computer programs unique to the embodiment.

An area 46a stores test pattern data used as the test pattern data in the area 45b. An area 46b holds the generated curvature correction data stored in the area 45f. The curvature correction data in the area 45f generated from a test pattern is held as the curvature correction data in the area 46b, and then the held curvature correction data in the area 46b is used for curvature correction in subsequent image formation based on image data.

An image data processing program 46c is used in the image forming apparatus. A curvature correction processing program 46d controls curvature correction processing in the embodiment shown in FIG. 4E (to be described later). A test pattern processing program 46e controls formation of a test pattern on the intermediate transfer member and detection of the test pattern by a photo-sensor. The test pattern processing program 46e is used in the curvature correction processing program 46d. A quadric curve calculating program 46f calculates, based on a test pattern detected by the photo-sensor, a quadric curve representing a curvature. The quadric curve calculating program 46f is used in the curvature correction processing program 46d. A quadric curve interpolating program 46g interpolates the curvature value of an intermediate laser beam from a quadric curve calculated based on a detected test pattern. The quadric curve interpolating program 46g is used in the curvature correction processing program 46d. A curvature correction data generating program 46h generates, as curvature correction data, scanning line selection data for correcting the curvature of each main scanning line. The curvature correction data generating program 46h is used in the curvature correction processing program 46d.

An input interface 47 interfaces input of data and signals from the outside. In this example, the input interface 47 receives image data from the image data generation unit 30. The input interface 47 also receives, from reflection photo-sensors 62, that is, 62a to 62c (to be described later with reference to FIG. 5), the sense signals of test patterns 61 for detecting the curvature of a scanning line. Sub-scanning position information of the test pattern 61 for detecting the curvature of a scanning line may also be calculated by the curvature correction unit 40, or calculated before input to the input interface 47, thereby inputting position information. When the CPU 43 is used to control the whole image forming apparatus, a keyboard, touch panel, external controller, communication controller, and the like are also connected to the input interface 47.

An output interface 48 interfaces output of data and signals to the outside. In this example, the image output unit 50, that is, a printer engine unit including an optical system and the like is connected to the output interface 48. When the CPU 43 is used to control the whole image forming apparatus, a display unit, communication controller, and the like are also connected to the output interface 48.

(Curvature Correction Data: Example of Structure of Main Scanning Line Selection Table)

FIG. 4C shows an example of the structure of the main scanning line selection table 45f or 46b generated based on the curvature correction data generating program 46h according to the embodiment.

The main scanning line selection table stores the correspondence between divided areas 1 to 16 of each of main scanning lines R1 (see FIGS. 7A and 7B) . . . R2 (see FIGS. 8A and 8C), and main scanning lines, for example, L2-L11 for R1 and L22-L27 for R2, used for forming images in respective these areas.

FIG. 4D is a view schematically showing a case where an image is actually formed based on data of the main scanning line R1 selection table in FIG. 4C.

Figure 7B:
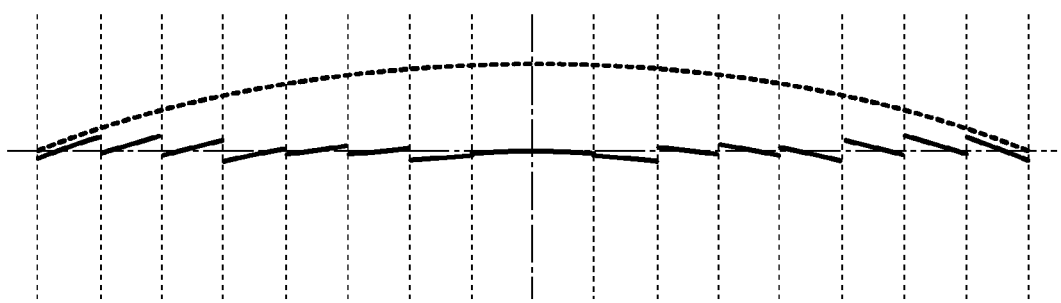
FIG. 7B is a view for explaining the result of correction processing in FIG. 7A.

FIG. 4D shows how to output main scanning lines L1 to L11 in the example of FIGS. 7A and 7B. As a method of shifting a scanning line, the address of a memory (RAM 45 in FIG. 4B) which stores image data is controlled to be stored as shown in FIG. 4D. Alternatively, the address is controlled to read out data as shown in FIG. 4D from the memory which stores image data. Instead, the address is controlled by a switching circuit serving as hardware. The embodiment does not limit these methods.

<Example of Operation of Curvature Correction Unit in Image Forming Apparatus According to Embodiment>

An example of the operation of curvature correction processing in the embodiment will be explained based on the arrangements of the image forming apparatus, optical scanning device, and curvature correction unit.

(Example of Operation of Curvature Value Detection Unit)

The curvature value detection unit 42 will be described in detail.

Figure 5:
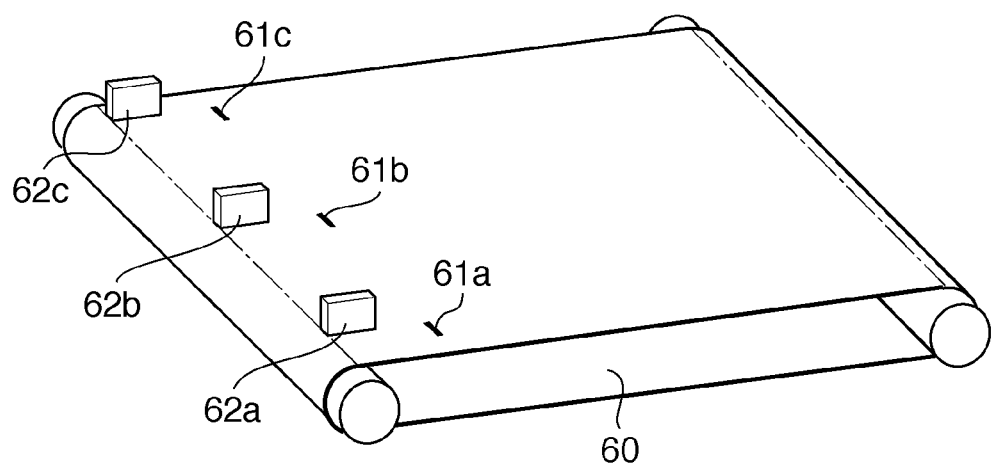
FIG. 5 is a perspective view showing an example of the curvature value detection mechanism of the image forming apparatus according to the embodiment.
Figure 6:
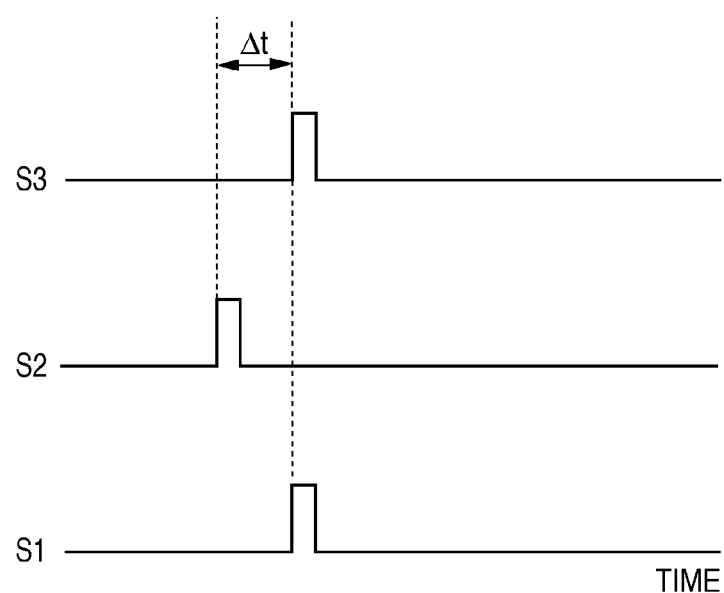
FIG. 6 is a timing chart for explaining the curvature value detection principle of the image forming apparatus according to the embodiment.

In the embodiment, test patterns 61a, 61b, and 61c for detecting a curvature value are printed in an effective scanning area on an intermediate transfer member 60 upon power-on of the apparatus, for a predetermined job, or at a predetermined time interval, as shown in FIG. 5. The test patterns 61a, 61b, and 61c are formed in a line shape in the main scanning direction at three portions (both ends and center in the main scanning direction) on the intermediate transfer member (or paper conveyance belt) 60 by one scanning. The read reflection photo-sensors 62a, 62b, and 62c are arranged at positions facing these test patterns. FIG. 6 shows, in time series, signals output from a pattern position detection unit in the curvature value detection unit 42 when the three photo-sensors read test patterns. The three pattern positions on one scanning line can be specified from the time difference Δt between the signals of test patterns at the both ends and the signal of a test pattern at the center. In general, the curvature of a scanning line in the optical scanning device is a simple quadric curve which protrudes or is recessed at the center. By a quadric curve calculating program 46f, the curvature profile of the entire scanning line can be calculated by complementing the remaining irradiation positions of laser beams by approximation by a quadric curve using the three coordinate points. Note that the number of test patterns is not limited to three. For descriptive convenience, the embodiment assumes that the scanning line does not have an inclination component.

(Example of Operation of Curvature Correction Processing Unit)

Curvature correction processing for correcting a curvature value after the curvature value detection unit 42 detects the curvature value in the above-described manner will be explained.

Lines L1 to L11 in FIG. 7A are ideal scanning lines on the photosensitive member. For example, when the line L1 is to be scanned without any correction, the actual scanning line on the photosensitive member becomes the scanning line R1 under the influence of the curvature of the scanning line that is caused by the aberration of the second imaging lens 22. To reduce the curvature, image data is so processed as to scan along a correction curve symmetrical to the scanning line R1, as shown in FIG. 7A. For this purpose, according to the embodiment, the effective scanning area is divided by the division unit into 16 areas in the main scanning direction. The scanning line to be written is selected to be shift in each scanning area, thereby correcting the curvature.

In area 1, the intersection point of a correction curve and a center line in area 1 is defined as C1. Area 1 is scanned by selecting a scanning line L2 closest to C1 in the sub-scanning direction. After the same processing is done for all the 16 areas, data are corrected as represented by selected bold lines on the lower side in FIG. 7A.

FIG. 7B shows the result of actually scanning the photosensitive member while correcting each main scanning line by selecting it to be shift. As is apparent from FIG. 7B, the curvature value of the corrected scanning line becomes much smaller than that of an uncorrected scanning line represented by a dotted line.

The output position of image data determined by a selection unit in the curvature correction processing unit 41 in accordance with the position of the laser beam of each scanning line is stored in the external storage 46 in correspondence with each scanning line. When forming an image, the scanning controller of the curvature correction unit 40 controls scanning by referring to the output position, thereby correcting the curvature of each scanning line. In terms of the processing speed, the output position is preferably stored in correspondence with each scanning line. In terms of the storage capacity, however, it is also possible to store the output positions of at least two scanning lines, and calculate an output position by interpolation when forming an image.

Figure 8A:
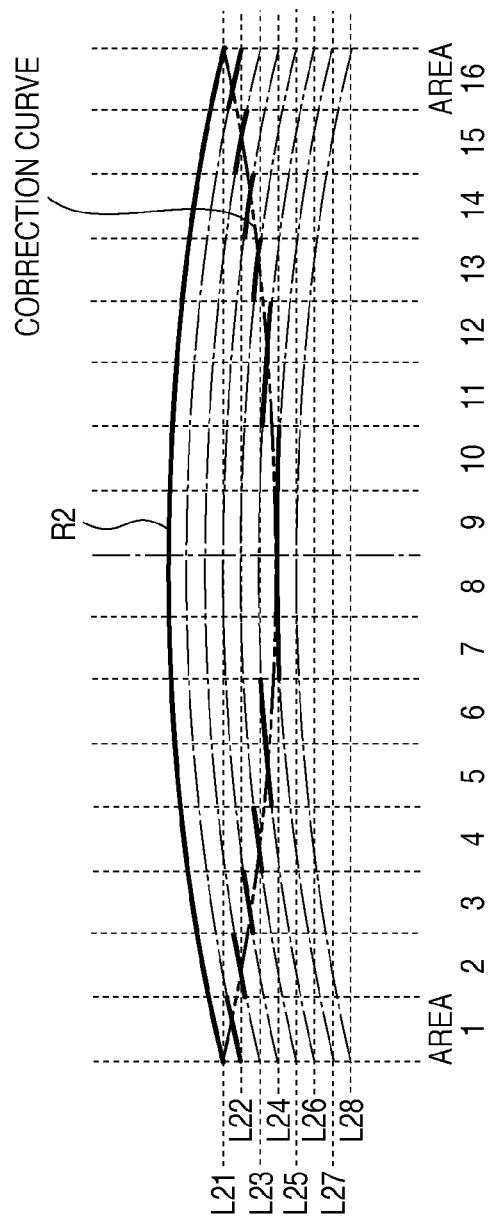
FIG. 8A is a view for explaining another example of curvature detection and correction processing according to the embodiment.
Figure 8B:
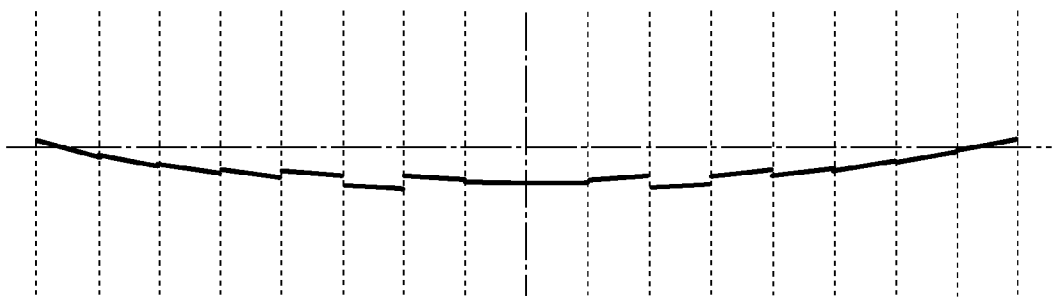
FIG. 8B is a view for explaining the result of correction processing in FIG. 7A.
Figure 8C:
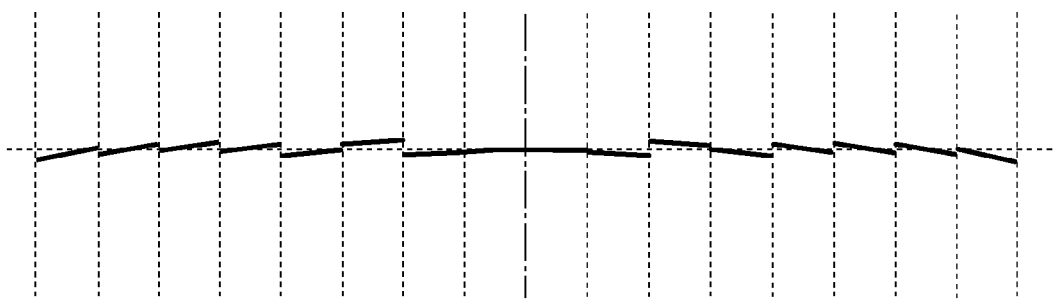
FIG. 8C is a view for explaining the result of correction processing in FIG. 8A.

As described above, the curvature value of the scanning line changes depending on the position where the laser beam passes the second imaging lens 22. FIG. 8A shows a case where the curvature value of a scanning line is smaller than that shown in FIG. 7A. If the scanning line having a small curvature value is corrected similarly to FIG. 7A, it appears as shown in FIG. 8B on the photosensitive member, generating a correction error. FIG. 8C shows the result of executing the following correction in accordance with a small curvature value.

To prevent a correction error as shown in FIG. 8B, the curvature value of each scanning line of the VCSEL is detected and properly corrected. However, for example, when the number of laser beams to be scanned is several ten, it takes a long time and requires a large-capacity memory to detect the curvature values of all the laser beams by using a test pattern as described above, which is not practical.

From this, according to the embodiment, the curvature values of only laser beams at both ends in the sub-scanning direction are actually detected using a test pattern. The curvature values of laser beams passing between the laser beams at both ends in the sub-scanning direction are calculated using data of the laser beams at both ends in the sub-scanning direction, as shown in FIG. 9.

Figure 9:
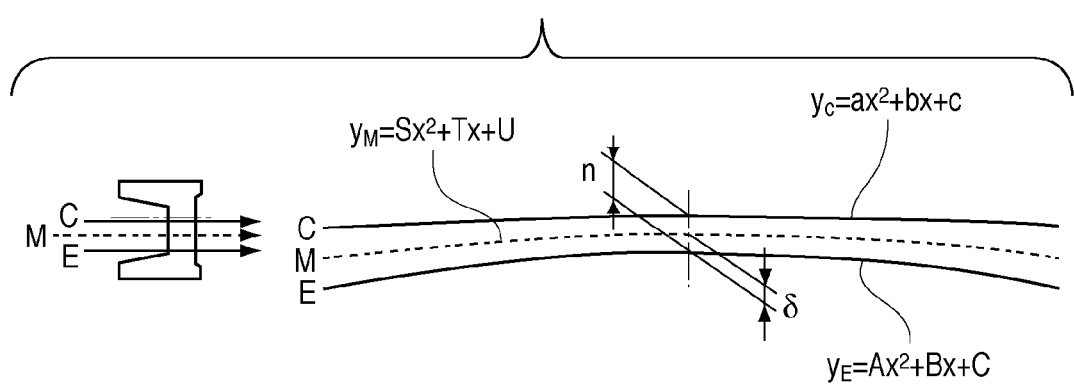
FIG. 9 is a view for explaining an example of interpolation of a quadric curve representing a curvature value according to the embodiment.

In FIG. 9, a scanning line C represents a scanning line passing through a position closest to the center of the imaging lens, and a scanning line E represents a scanning line passing through a position farthest from the center, as described above. A scanning line M is an arbitrary one extracted from scanning lines passing between the scanning lines C and E. In practice, several ten scanning lines emitted from the VCSEL exist between the scanning lines C and E.

Quadratic equations representing the curvatures of the scanning lines C and E are given by measurement using a test pattern:

$$y_C = ax^2 + bx + c$$

$$y_E = Ax^2 + Bx + C$$

A quadratic equation representing the curvature of the intermediate scanning line M is defined as $$y_M = Sx^2 + Tx + U$$

At this time, S and U are given by $$S = (A-a)\delta/n + a$$

$$U = (C-c)\delta/n + c$$

wherein δ and n are determined from the scanning line pitch and a total number of scanning lines.

The coefficient of the linear term represents the inclination of the scanning line. The inclination value does not change for each scanning line, unlike the curvature, and thus can be defined as $$b \approx B \approx T$$

Hence, the profile of a scanning line between the scanning lines C and E can be calculated using the curvature profiles of the scanning lines C and E. While suppressing memory consumption, curvature correction optimal for each scanning line can be executed within a short time without measuring the curvature values of all scanning lines.

<Example of Operation Procedures of Curvature Correction Unit in Image Forming Apparatus According to Embodiment>

Figure 4E:
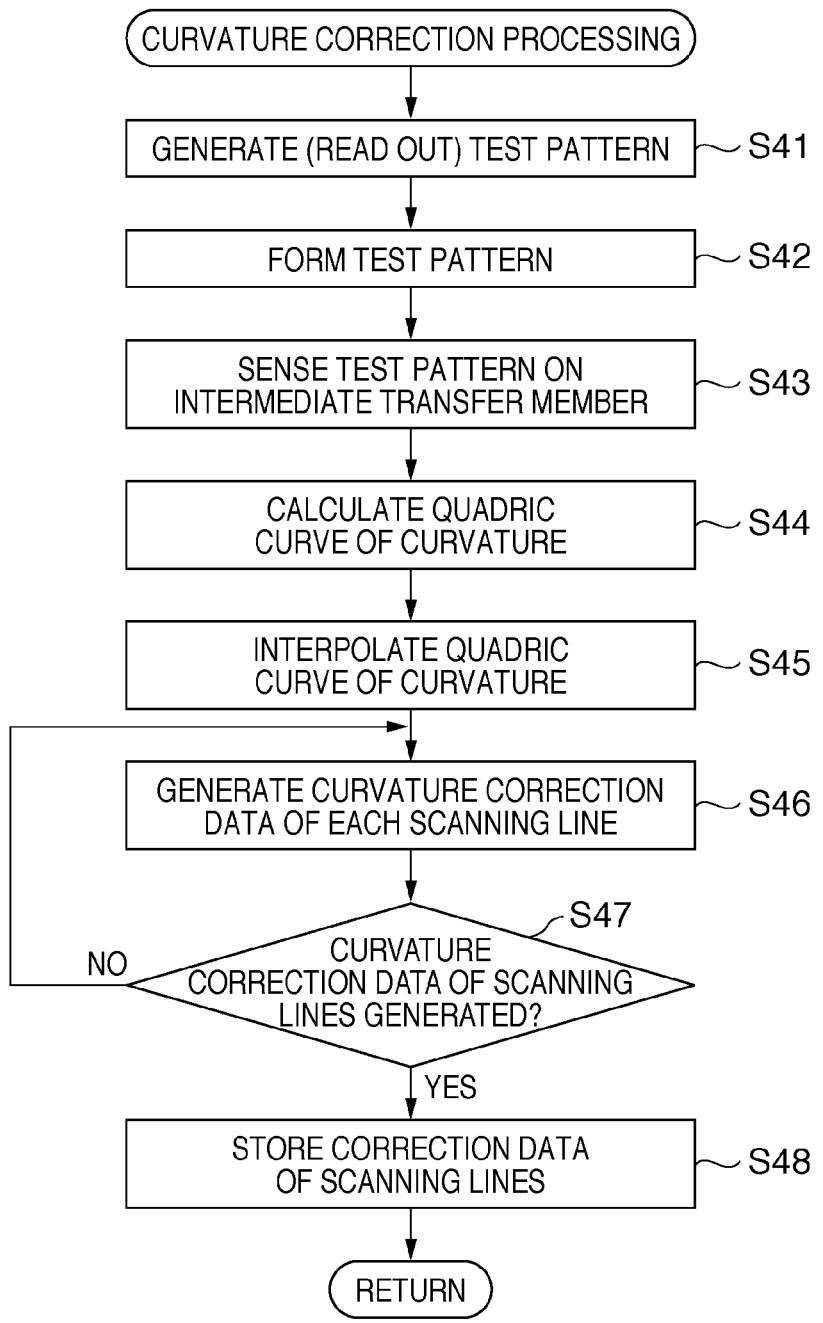
FIG. 4E is a flowchart showing an example of the processing procedures of the curvature correction unit according to the embodiment.

FIG. 4E is a flowchart showing an example of the operation procedures of the curvature correction unit in the image forming apparatus according to the embodiment. The flowchart in FIG. 4E pays attention to only curvature correction processing in the embodiment, and omits other processes in the image forming apparatus. The flowchart in FIG. 4E shows the procedures of the curvature correction processing program 46*d* in FIG. 4B, and is executed by the CPU 43.

In step S41, test patterns as shown in FIG. 5 for detecting a curvature value are generated. Alternatively, test patterns generated in advance are read out. In step S42, the pattern forming unit forms the patterns 61*a* to 61*c* as shown in FIG. 5 on the intermediate transfer member 60 in accordance with the test patterns. In step S43, the reflection photo-sensors 62*a* to 62*c* read the formed test patterns 61*a* to 61*c*.

A quadric curve passing through three points is calculated based on the difference (see FIG. 6) between the test pattern reading timings of the reflection photo-sensors 62*a*, 62*b*, and 62*c*. The quadric curve is defined as the curvature value in the sub-scanning direction of the scanning line at each main scanning position.

In this example, steps S41 to S44 are executed for two laser beams, that is, a laser beam passing through the center of the imaging lens 22 and a laser beam passing through a position farthest from the center. The present invention is not limited to this example, and the quadric curves of three or more laser beams may also be calculated.

In step S45, the calculation unit of the present invention calculates the curvature value of an uncalculated quadric curve of a laser beam by interpolation from the curvature values of the quadric curves calculated in steps up to step S44. This interpolation is performed using the quadric term and constant term (see FIG. 9).

In step S46, correction data are generated in correspondence with the curvature values of scanning lines calculated in steps up to step S45.

The embodiment has described a configuration in which a mechanism for detecting the curvature value of a scanning line is arranged in the image forming apparatus to properly correct the curvature. However, for an image forming apparatus in which the curvature value hardly varies during operation, it is also possible to detect the curvature value only during assembly in a factory.

In the embodiment, the curvature value of a scanning line is estimated by calculation from curvature data of some other scanning lines. It is also technically possible to measure the curvature values of all scanning lines and correct each scanning line.

In the embodiment, the curvature value is approximated by a quadric curve, but may also be approximated by another approximate curve.

By exemplifying beams at both ends in the sub-scanning direction, the embodiment has described the fact that the curvature value differs between scanning lines as the positions where beams pass the imaging lens are spaced apart from each other when the number of scanning lines is very large. Also, the influence of curvature can be suppressed by applying the embodiment when the curvature value greatly differs between scanning lines though scanning lines are close to each other for a lens having a large aberration. This improves the usability of the lens and the degree of freedom of the optical design.

The embodiment employs the VCSEL as a light source. However, even an edge-emitting semiconductor laser can obtain the same effects.

The present invention may also be applied to a system or integrated apparatus including a plurality of devices (for example, a host computer, interface device, and printer), or an apparatus formed by a single device.

The object of the present invention is also achieved by supplying a storage medium (or recording medium) which stores software program codes for implementing the functions of the above-described embodiment to a system or apparatus, and reading out and executing the program codes stored in the storage medium by the computer (or the CPU or MPU) of the system or apparatus.

In this case, the program codes read out from the storage medium implement the functions of the above-described embodiment, and the storage medium which stores the program codes constitutes the present invention.

The functions of the above-described embodiment are implemented by executing the readout program codes by the computer. Also, the present invention includes a case where an OS (Operating System) or the like running on the computer performs part or all of actual processing based on the instructions of the program codes and thereby implements the functions of the above-described embodiments.

Furthermore, the present invention includes a case where the functions of the above-described embodiment are implemented by the following processing. More specifically, the program codes read out from the storage medium are written in the memory of a function expansion card inserted into the computer or the memory of a function expansion unit connected to the computer. After that, the CPU of the function expansion card or function expansion unit performs part or all of actual processing based on the instructions of the program codes.

When the present invention is applied to the storage medium, the storage medium stores program codes corresponding to the above-described flowchart.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-135951, filed May 22, 2007, which is hereby incorporated by reference herein in its entirety.

What is claimed is:

1. An optical scanning device which forms a plurality of scanning lines on a photosensitive member, comprising:
   a plurality of light sources configured to emit m light beams for exposing different positions on one photosensitive member in a rotation direction of the one photosensitive member;
   a deflection unit configured to deflect the m light beams such that the m light beams scan the photosensitive member in a main-scanning direction;
   a lens through which the m deflected light beams pass;
   a curvature detection unit configured to detect n first curvatures of n (n<m) first light beams in the m light beams in a sub-scanning direction orthogonal to the main-scanning direction, and to determine n first equations representing the n first curvatures of the n first light beams based on the detected n first curvatures;
   an interpolating unit configured to interpolate using the n first equations to obtain (m−n) second equations representing (m−n) second curvatures of (m−n) second light beams other than the n first light beams in the m light beams; and
   a calculating unit configured to calculate n first correction data of the n first light beams based on the n first equations and (m−n) second correction data of the (m−n) second light beams based on the (m−n) second equations.

2. The device according to claim 1, wherein said curvature detection unit comprises:
   a control unit configured to control the plurality of light sources to form patterns in the main-scanning direction on the photosensitive member;
   a pattern position detection unit configured to detect the formed patterns; and
   a curve calculation unit configured to calculate a quadric curve factor based on the detected patterns.

3. The device according to claim 1, wherein curvature in the sub-scanning direction of each of the m light beams is generated by aberration of the lens, and curvatures in the sub-scanning direction of the m light beams are different owing to a difference of the aberration corresponding to a position of the lens through which each of the m light beams passes.

4. An image forming apparatus including an optical scanning device according to claim 1.

5. A method of controlling an image forming apparatus including a plurality of light sources configured to emit m light beams for exposing different positions on one photosensitive member in a rotation direction of the one photosensitive member; a deflection unit configured to deflect the m light beams such that the m light beams scan the photosensitive member in a main-scanning direction; and lens through which the m deflected light beams pass, the method comprising the steps of:

detecting n first curvatures of n (n<m) first light beams in the m light beams in a sub-scanning direction orthogonal to the main-scanning direction;

determining n first equations representing the n first curvatures of the n first light beams based on the detected n first curvatures;

interpolating using the n first equations to obtain (m−n) second equations representing (m−n) second curvatures of (m−n) second light beams other than the n first light beams in the m light beams; and calculating n first correction data of the n first light beams based on the n first equations and (m−n) second correction data of the (m−n) second light beams based on the (m−n) second equations.

6. The device according to claim 1, wherein the n first equations and the (m−n) second equations are multidimensional functions, the curvature detection unit is further configured to determine coefficients of the multidimensional functions based on the detected n first curvatures, and the interpolating unit is further configured to interpolate using coefficients of the n first equations to obtain coefficients of the (m−n) second equations.

* * * * *